United States Patent
Luo

(10) Patent No.: US 12,294,265 B2
(45) Date of Patent: May 6, 2025

(54) FLAT WIRE STATOR AND MOTOR

(71) Applicant: Xiaomi EV Technology Co., Ltd., Beijing (CN)

(72) Inventor: Wenhui Luo, Beijing (CN)

(73) Assignee: Xiaomi EV Technology Co., Ltd., Beijing (CN)

( * ) Notice: Subject to any disclaimer, the term of this patent is extended or adjusted under 35 U.S.C. 154(b) by 366 days.

(21) Appl. No.: 17/877,058

(22) Filed: Jul. 29, 2022

(65) Prior Publication Data

US 2023/0268789 A1 Aug. 24, 2023

(30) Foreign Application Priority Data

Feb. 22, 2022 (CN) .......................... 202210163266.2

(51) Int. Cl.
*H02K 3/28* (2006.01)

(52) U.S. Cl.
CPC ...................... *H02K 3/28* (2013.01)

(58) Field of Classification Search
CPC .. H02K 3/28; H02K 1/16; H02K 3/12; H02K 15/0081; H02K 15/0087; H02K 15/0421; H02K 15/064; Y02T 10/64
See application file for complete search history.

(56) References Cited

U.S. PATENT DOCUMENTS

| | | |
|---|---|---|
| 2003/0214196 A1 | 11/2003 | Cai et al. |
| 2021/0305869 A1 | 9/2021 | Sakuma |

FOREIGN PATENT DOCUMENTS

| | | | | |
|---|---|---|---|---|
| CN | 103001365 A | | 3/2013 | |
| CN | 110556956 A | | 12/2019 | |
| CN | 113348607 A | * | 9/2021 | ............... H02K 3/12 |
| CN | 110556954 B | | 10/2021 | |
| CN | 113783334 A | | 12/2021 | |
| CN | 113809857 A | | 12/2021 | |
| CN | 215300307 U | | 12/2021 | |
| WO | 2021153552 A1 | | 8/2021 | |

OTHER PUBLICATIONS

English translation of CN-113783334-A (Year: 2021).*
English translation of CN-113348607-A (Year: 2021).*
English translation of CN-110556954-A (Year: 2019).*

(Continued)

*Primary Examiner* — Tulsidas C Patel
*Assistant Examiner* — Joshua Kiel M Rodriguez
(74) *Attorney, Agent, or Firm* — Volpe Koenig

(57) ABSTRACT

A flat wire stator which includes an iron core and a flat wire winding; the flat wire winding includes a first phase winding, the first phase winding includes a plurality of coils, the plurality of coils are distributed in rotational symmetry around an axis of the iron core, the coils are wound in a portion of iron core slots in the plurality of iron core slots, and first ends and second ends of the coils are located at the same end of the iron core; and the plurality of coils are connected in series in sequence, the first end of each coil is connected to the first end of one coil of two coils adjacent to the coil, and the second end of the each coil is connected to the second end of the other coil of the two coils adjacent to the one coil.

17 Claims, 10 Drawing Sheets

(56) References Cited

OTHER PUBLICATIONS

Chinese First Search issued on May 27, 2022 for Chinese Patent Application No. 202210163266.2.
Chinese First Office Action issued on Jun. 22, 2022 for Chinese Patent Application No. 202210163266.2.
Chinese Second Office Action issued on Jul. 29, 2022 for Chinese Patent Application No. 202210163266.2.
Chinese Supplementary Search issued on Oct. 14, 2022 for Chinese Patent Application No. 202210163266.2.
Communication Pursuant to Article 94(3) EPC issued on Apr. 11, 2024 for European Patent Application No. 22187559.4.
Extended European Search Report issued on May 26, 2023 for European Patent Application No. 22187559.4.

\* cited by examiner

FLAT WIRE STATOR AND MOTOR

CROSS REFERENCE TO RELATED APPLICATION

The present application claims priority to Chinese Patent Application No. 202210163266.2, filed on Feb. 22, 2022. The entire contents of the above-listed application is hereby incorporated by reference for all purposes.

BACKGROUND

With increasingly vigorous development of electric automobiles, a power density of a motor of the electric automobile is higher and higher. Compared with a round wire motor, a flat wire motor has a higher space filling factor. Improvement of the space filling factor means that filling with more copper wires can be realized on the premise of no change of space, a more powerful magnetic field can be generated, and the power density can be further improved.

The flat wire motor includes a rotor and a flat wire stator, and the flat wire stator includes an iron core and a flat wire winding. A winding mode of the flat wire winding may have an influence on performance, process and the like of the flat wire motor. The flat wire winding in the flat wire motor is formed by welding hair-pin flat wires inserted into iron core slots, the adopted hair-pin flat wires have the same structure, process difficulty can be reduced, production efficiency is improved, and the more the varieties of adopted hair-pin flat wires are, the lower the production efficiency becomes.

In the related art, during wire winding of the flat wire winding, firstly, wire winding is performed in the plurality of iron core slots in a circumferential direction of the iron core to form a winding layer, and then the flat wires cross to another layer to be wound in the plurality of iron core slots in the circumferential direction of the iron core so as to form another winding layer till it reaches the needed quantity of layers.

SUMMARY

The disclosure relates to the field of motors, in particular to a flat wire stator and a motor. The technical solution is as follows.

According to a first aspect of example of the disclosure, a flat wire stator is provided, the flat wire includes an iron core and a flat wire winding;
  the iron core has a plurality of iron core slots;
  the flat wire winding includes a first phase winding, the first phase winding includes a plurality of coils, the plurality of coils are distributed in rotational symmetry around an axis of the iron core, the coils are wound in a part of iron core slots in the plurality of the iron core slots, first ends and second ends of the coils are located at the same end of the iron core, the first ends are located on the sides of the iron core slots close to the axis of the iron core, and the second ends are located on the sides of the iron core slots away from the axis of the iron core;
  the plurality of coils are connected in series in sequence, the first end of a coil is connected to the first end of one coil of two coils adjacent to the coil, and the second end of the coil is connected to the second end of the other coil of the two coils adjacent to the coil.
beneficial effects brought by the technical solution provided by the example of the disclosure at least include: by arranging the winding in the same phase in a mode of including the plurality of coils connected in series in sequence, the plurality of coils are distributed in rotational symmetry around the axis of the iron core, the coils are wound in a part of the iron core slots, the first ends and the second ends of the coils are located on the sides of the iron core slots close to the axis of the iron core and on the sides of the iron core slots away from the axis of the iron core, respectively, that is, extending from the first ends of the coils to the second ends, a plurality of layers of windings are formed gradually instead of forming a layer of winding and then crossing to another layer to form another layer of winding, arranging an additional flat wire conductor for crossing from one layer to another layer is not needed, thus the varieties of the adopted hair-pin flat wires during wire winding can be reduced, and the production efficiency can be improved.

It should be understood that the above general description and the following detailed description are only illustrative and explanatory, and may not limit the disclosure.

BRIEF DESCRIPTION OF THE DRAWINGS

In order to describe technical solutions in the examples of the disclosure more clearly, the accompanying drawings needed in the description of the examples will be briefly introduced below. The accompanying drawings in the following description are merely some examples of the disclosure. Those ordinarily skilled in the art can further obtain other accompanying drawings according to these accompanying drawings without creative work.

DETAILED DESCRIPTION

In order to make objectives, technical solutions and advantages of the disclosure clearer, implementations of the disclosure will be further described in detail below with reference to the accompanying drawings.

Unless otherwise defined, technical or scientific terms used herein should be commonly understood by those ordinarily skilled in the art to which the disclosure belongs. "First", "second", "third" and similar words used in the specification and claims of the patent application of the disclosure do not represent any sequence, quantity or significance but merely intend to distinguish different components. Likewise, "one" or "a/an" and similar words do not represent quantity limit but represent "at least one".

"Include" or "contain" and similar words mean that an element or item preceding "include" or "contain" covers an element or an item and its equivalents listed after "include" or "contain" without excluding other elements or items. "Connected" or "connection" and similar words are not limited to a physical or mechanical connection, but may include an electrical connection, direct or indirect. "Up", "down", "left", "right" and the like are merely used for representing a relative position relation, and if an absolute position of a described object changes, the related position relation may also change correspondingly.

There are varieties of hair-pin flat wires needed in the winding mode in the related art, which results in the lower production efficiency.

Figure 1:
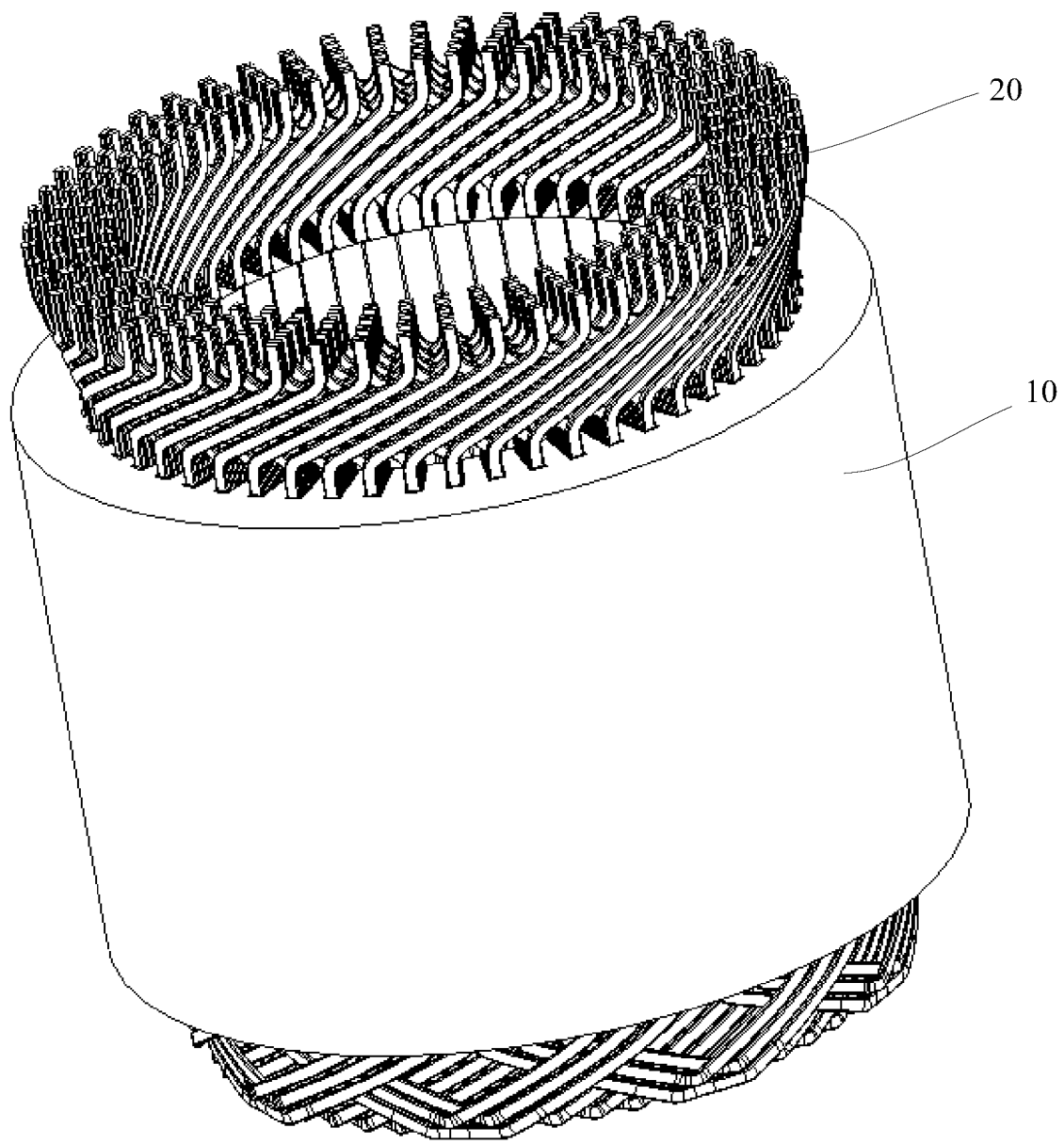
FIG. 1 is a schematic structural diagram of a flat wire stator provided by an example of the disclosure.

FIG. 1 is a schematic structural diagram of a flat wire stator provided by an example of the disclosure. As shown in FIG. 1, the flat wire stator includes an iron core 10 and a flat wire winding 20.

Figure 2:
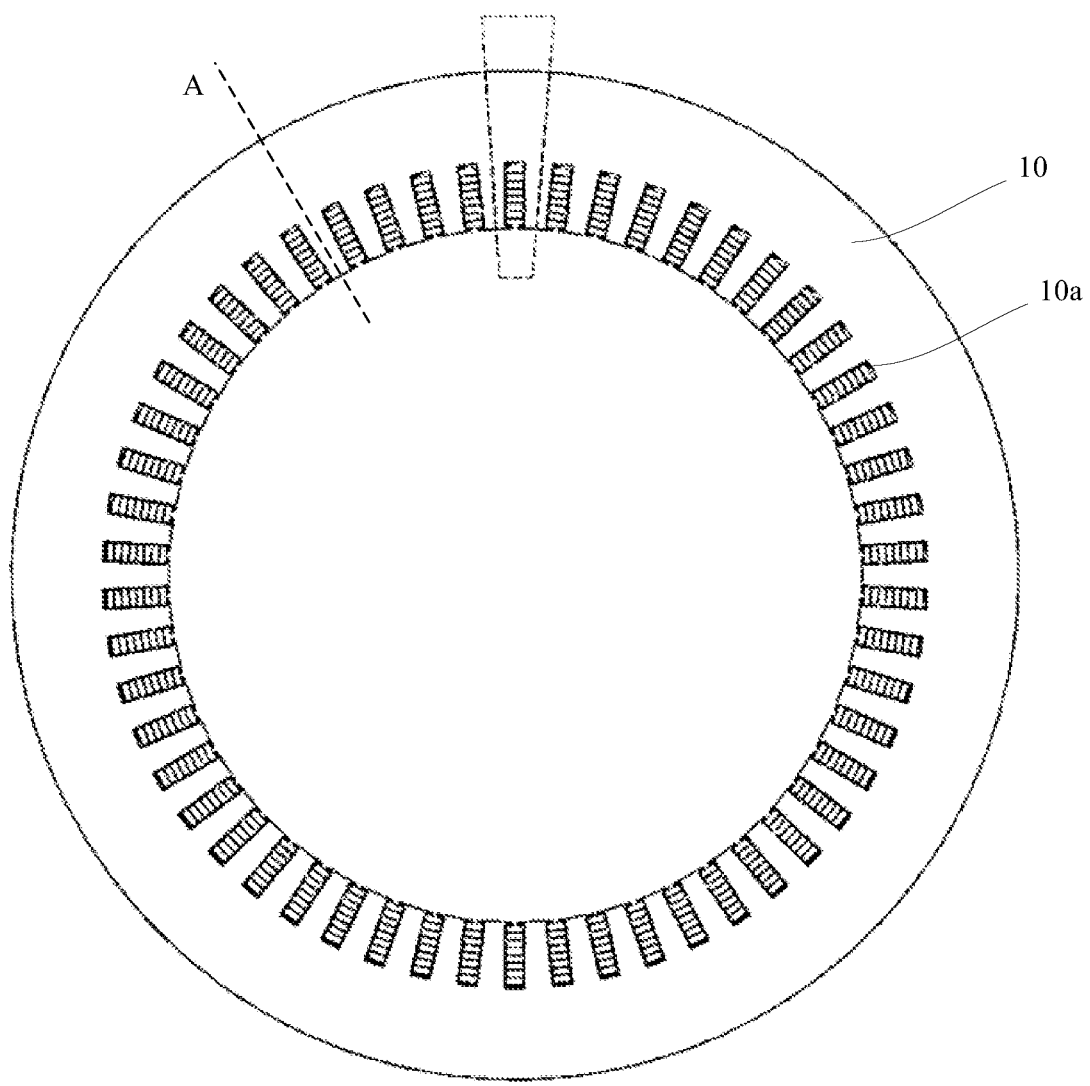
FIG. 2 is a schematic diagram of an end surface of an iron core provided by an example of the disclosure.

FIG. 2 is a schematic diagram of an end surface of an iron core provided by an example of the disclosure. As shown in FIG. 2, the iron core 10 has a plurality of iron core slots 10a. The iron core 10 is cylindric, and the plurality of iron core slots 10a are distributed on an inner side wall of the iron core 10 in a circumferential direction of the iron core 10. The iron core slots 10a are configured to wind the flat wire winding 20.

Figure 3:
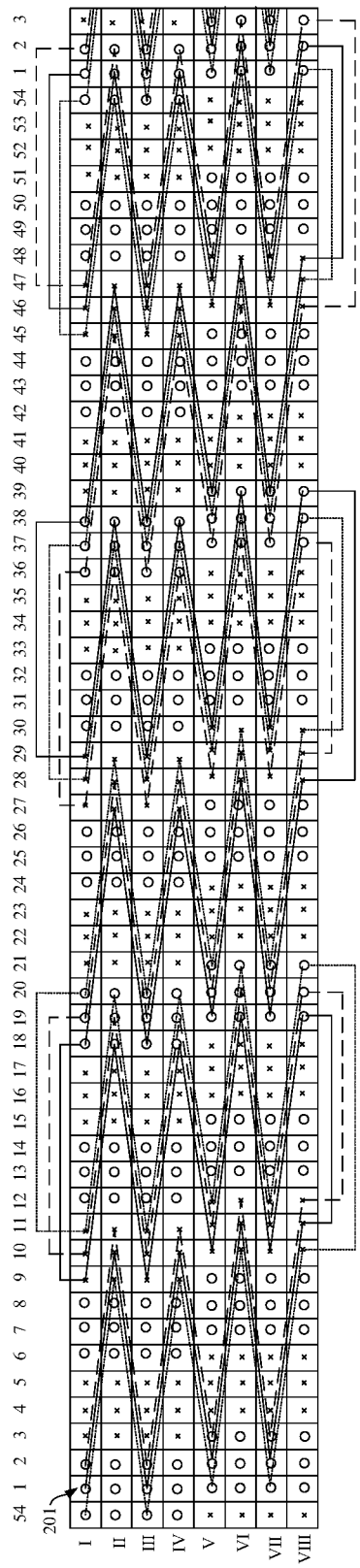
FIG. 3 is a schematic expanded view of a flat wire winding provided by an example of the disclosure.

FIG. 3 is a schematic expanded view of a flat wire winding provided by an example of the disclosure. What is shown in the figure is an expanded end surface of the iron core 10 after cutting along a dotted line A in FIG. 2. Each column in the figure represents an iron core slot 10a. For convenience of understanding, the plurality of iron core slots 10a are marked with Arabic numerals, respectively, the iron core slots 10a marked by 1, 2, 3 and 54 are repeatedly shown, and a side with marks of 1 to 54 is an inner side of the iron core 10. In the figure, "o" represents a flat wire conductor extending from a paper surface to outside in the iron core slots 10a, "x" represents a flat wire conductor extending from the paper surface to inside, and a line connecting "o" and "x" represents a flat wire conductor located outside the iron core slots 10a. As shown in FIG. 3, the flat wire winding 20 includes a first phase winding 201.

For example, as for a three-phase motor, the flat wire winding 20 further includes a second phase winding and a third phase winding, and the first phase winding 201, the second phase winding and the third phase winding are distributed in rotational symmetry around an axis of the iron core 10. The first phase winding 201, the second phase winding and the third phase winding have the same structure, the line connecting "o" and "x" shown in FIG. 3, and "o" and "x" connected by the line constitute the first phase winding 201. The rest of "o" and "x" in the figure are connected by a line with reference to the first phase winding 201, so the second phase winding and the third phase winding are obtained. The example of the disclosure is described by taking the structure of the first phase winding 201 as an example.

Figure 4:
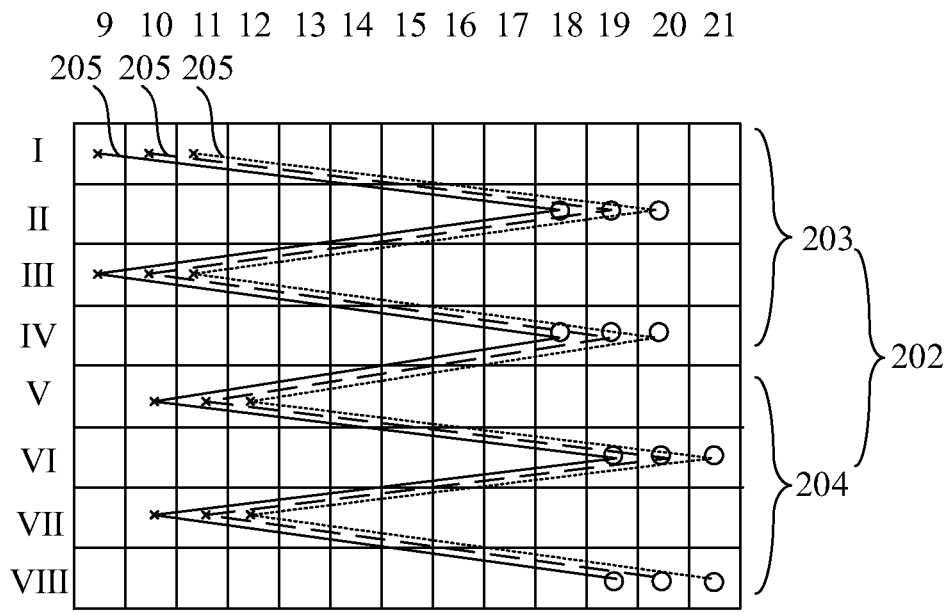
FIG. 4 is a schematic partial enlargement view of FIG. 3.

The first phase winding 201 includes a plurality of coils 202. FIG. 4 is a schematic partial enlargement view of FIG. 3. One coil 202 is shown in FIG. 4. Combining with FIG. 3, the plurality of coils 202 are distributed in rotational symmetry around an axis of the iron core 10, and the coils 202 are wound in a portion of iron core slots 10a in the plurality of iron core slots 10a. A first end and a second end of the coil 202 are located at the same end of the iron core 10, the first end is located on a side, namely, an upper side of FIG. 4, of the iron core slot 10a close to the axis of the iron core 10, and the second end is located on a side, namely, a lower side of FIG. 4, of the iron core slot 10a away from the axis of the iron core 10.

Figure 5:
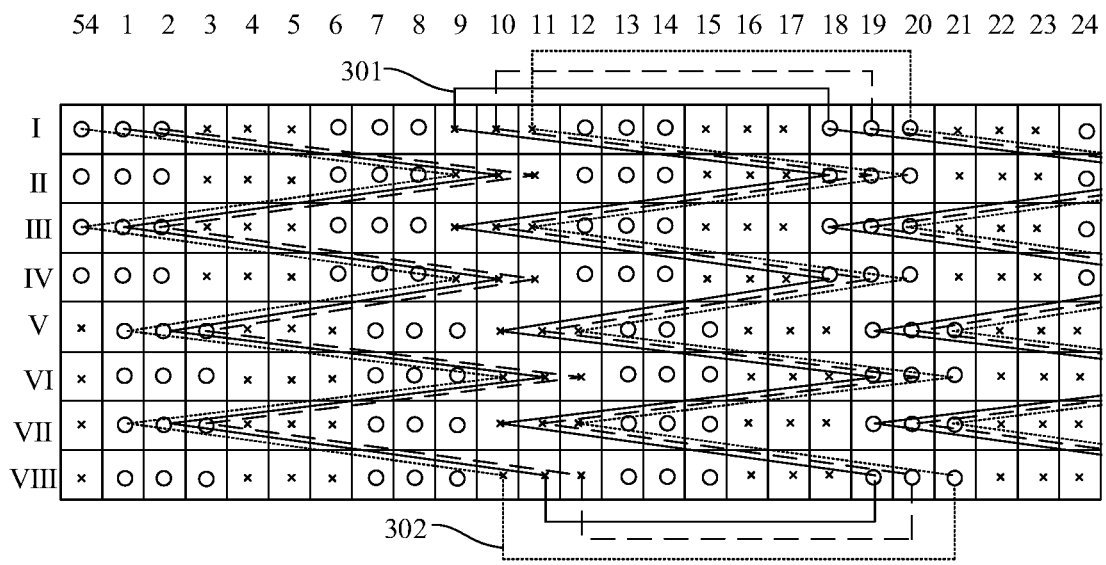
FIG. 5 is a schematic partial enlargement view of FIG. 3.

FIG. 5 is a schematic partial enlargement view of FIG. 3. As shown in FIG. 5, the plurality of coils 202 are connected in series in sequence, the first end of a coil 202 is connected to the first end of one coil 202 of two coils 202 adjacent to the coil, and the second end of the coil 202 is connected to the second end of the other coil 202 of the two coils 202 adjacent to the coil.

By arranging the winding in the same phase in a mode of including the plurality of coils connected in series in sequence, the plurality of coils are distributed in rotational symmetry around the axis of the iron core, the coils are wound in a part of the iron core slots, the first ends and the second ends of the coils are located on the sides of the iron core slots close to the axis of the iron core and on the sides of the iron core slots away from the axis of the iron core, respectively, that is, extending from the first ends of the coils to the second ends, a plurality of layers of windings are formed gradually instead of forming a layer of winding and then crossing to another layer to form another layer of winding, arranging an additional flat wire conductor for crossing from one layer to another layer is not needed, thus the varieties of the adopted hair-pin flat wires during wire winding can be reduced, and the production efficiency can be improved.

Optionally, the quantity of the iron core slots 10a is 18p, p is the number of pole-pairs, and the quantity of turns of the coils 202 in each iron core slot 10a is 4 m, and m is a positive integer.

The coil 202 is formed by flat wire conductors, for example, a copper flat wire. The quantity of turns of the coils 202 in each iron core slot 10a is the quantity of layers of the flat wire conductors contained in the same iron core slot 10a.

An insulation material, for example, insulation resin, is arranged in the iron core slots 10a, so as insulate the flat wire winding 20 from the iron core 10.

Figure 6:
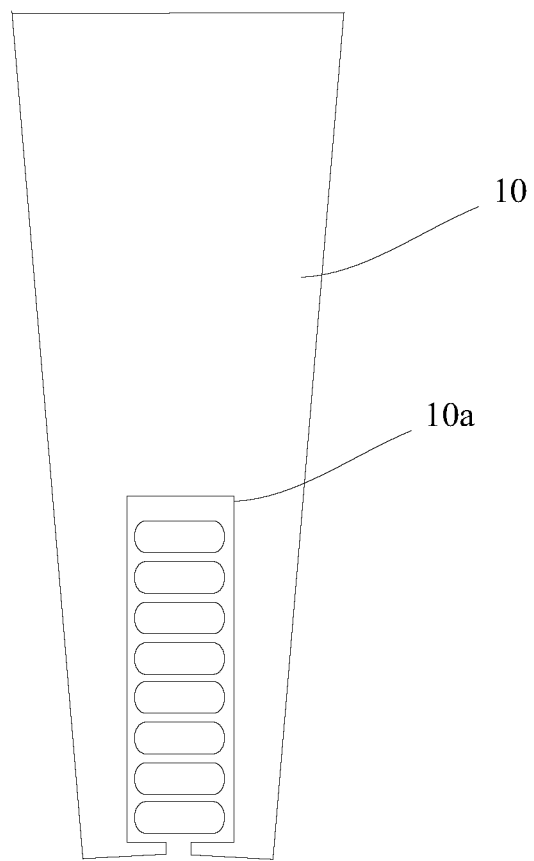
FIG. 6 is a schematic partial enlargement view in FIG. 2.

As for different motors, a value of p and a value of m may differ. The value of p and the value of m may be set according to a demand for performance of the motors. The example of the disclosure makes description by taking p=3 and m=2 as an example, that is, the iron core 10 has 54 iron core slots 10a. For convenience of description, in the circumferential direction of the iron core 10, the 54 iron core slots 10a are numbered in sequence, as shown in FIG. 3. FIG. 6 is a schematic partial enlargement view of FIG. 2. As shown in FIG. 6, the quantity of turns of the coils 202 in each iron core slot 10a is 8, there are 8 layers of flat wire conductors in each iron core slot 10a, the layer closest to the axis of the iron core 10 is a first layer, then there are a second layer, a third layer, a fourth layer, a fifth layer, a sixth layer, a seventh layer and an eighth layer outwards in a radial direction of the iron core 10 in sequence, which are distinguished by Roman characters "I", "II" . . . "VII" in FIG. 3, FIG. 4 and FIG. 5, respectively.

Optionally, as shown in FIG. 4, the coils 202 include a plurality of branches 205. During wiring of the flat wire motor, the plurality of branches 205 of the coils 202 are connected in parallel, so that a larger current can flow into the coils 202, and a more powerful magnetic field can be formed.

The same coil 202 may include Z branches 205, and Z is an integer no smaller than 3. In the example of the disclosure, description is made by taking the coil 202 including 3 branches 205 as an example. In other examples, the coil 202 may also include less or more branches 205.

As shown in FIG. 4, the plurality of branches 205 in the same coil 202 are arranged by offset of one iron core slot 10a in sequence in the circumferential direction of the iron core 10. As shown in FIG. 5, at the first end of the coil 202, the plurality of branches 205 are connected in one-to-one correspondence with a plurality of branches 205 of one coil 202 of two coils 202 adjacent to the coil through a plurality of first jumper wires 301. At the second end of the coil 202, the plurality of branches 205 are connected in one-to-one correspondence with a plurality of branches 205 of the other coil 202 of the two coils 202 adjacent to the coil through a plurality of second jumper wires 302.

Taking one coil 202 shown in FIG. 4 as an example, the 3 branches 205 are offset by one iron core slot 10a in sequence in a first direction. In this way, at the first end and the second end of the coil 202, the 3 branches 205 are closer to one another, so that the first jumper wires 301 and the second jumper wires 302 are conveniently arranged for wiring.

For convenience of description, (n, m) is defined to represent the $m^{th}$ layer of the number n iron core slot 10a. One branch 205 of one coil 202 crosses from (1, 1) to (10, 2), then crosses from (10, 2) to (1, 3), then crosses from (1, 3) to (10, 4), then crosses from (10, 4) to (2, 5), then crosses from (2, 5) to (11, 6), then crosses from (11, 6) to (2, 7), and then crosses from (2, 7) to (11, 8). The branch 205 crosses from (11, 8) to (19, 8) to be connected to a branch 205 in the adjacent coil 202. The branch crosses from (19, 8) to (10, 7), then crosses from (10, 7) to (19, 6), then crosses from (19, 6) to (10, 5), then crosses from (10, 5) to (18, 4), then crosses from (18, 4) to (9, 3), then crosses from (9, 3) to (18, 2) and then crosses from (18, 2) to (9, 1). The branch 205 crosses from (9, 1) to (18, 1) to be connected to a branch 205 of another adjacent coil 202, winding is repeated in the same mode till reaching (46, 1), and thus one branch 205 of the plurality of coils 202 is connected in series in sequence. An outgoing line may be connected to (1, 1) and (46, 1) separately. The other branches may be connected in the same mode. A connection position of the outgoing line is merely an example, and in other examples, the outgoing line may be led out from other positions.

As shown in FIG. 4, the branch 205 includes a first sub-coil 203 and a second sub-coil 204 connected to each other, and the first sub-coil 203 is located on a side of the second sub-coil 204 close to the axis of the iron core 10.

The first sub-coil 203 is wound in the two iron core slots 10a which are mutually spaced, the second sub-coil 204 is wound in the other two iron core slots 10a which are mutually spaced, the two iron core slots 10a where the second sub-coil 204 is located are offset by one iron core slot 10a in the same direction respectively relative to the two iron core slots 10a where the first sub-coil 203 is located.

Taking one branch 205 of one coil 202 as an example, as shown in FIGS. 4 and 5, the first sub-coil 203 crosses from (1, 1) to (10, 2), then crosses from (10, 2) to (1, 3) and then crosses from (1, 3) to (10, 4). The first sub-coil 203 crosses from (10, 4) to (2, 5) to be connected to one end of the second sub-coil 204. The second sub-coil 204 crosses from (2, 5) to (11, 6), then crosses from (11, 6) to (2, 7) and then crosses from (2, 7) to (11, 8).

That is, the first sub-coil 203 and the second sub-coil 204 are not wound in the same two iron core slots 10a, rather, the first sub-coil 203 and the second sub-coil 204 are staggered by a certain distance in a circumferential direction of the iron core 10.

In the example, the two iron core slots 10a in which the first sub-coil 203 is wound are spaced at an interval of 8 iron core slots 10a, the first sub-coil 203 is located outside the two iron core slots 10a, a span of a flat wire conductor connected with the two iron core slots 10a in a crossing mode is 9, and the span refers to the quantity (of the iron core slots 10a between the two connected iron core slots 10a) plus 1. For example, the flat wire conductor is connected with the two adjacent iron core slots 10a, so the span is 1. The two iron core slots 10a in which the second sub-coil 204 is wound are also spaced at an interval of 8 iron core slots 10a, the second sub-coil 204 is located outside the two iron core slots 10a, and a span of a flat wire conductor connected with the two iron core slots 10a in a crossing mode is also 9. In the coil 202, connected ends of the first sub-coil 203 and the second sub-coil 204 are spaced at an interval of merely 7 iron core slots 10a, so the span is 8. This is for making a pitch smaller than a pole distance to form a short-chord winding. The short-chord winding can weaken higher harmonics, vibration in a motor running process is reduced, noise is lowered, and an NVH (noise, vibration and harshness) performance is improved.

The first sub-coil 203 crosses from (1, 1) to (10, 2), crosses from (10, 2) to (1, 3), and crosses from (1, 3) to (10, 4), the second sub-coil 204 crosses from (2, 5) to (11, 6), crosses from (11, 6) to (2, 7) and crosses from (2, 7) to (11, 8), spans of these parts are the same, which cross between two adjacent layers, so flat wire conductors of these parts may have the same structure, thus the process difficulty is further reduced, and the production efficiency is improved.

Optionally, the quantity of turns of the first sub-coil 203 is the same as the quantity of turns of the second sub-coil 204, that is, relative offset of the first sub-coil 203 and the second sub-coil 204 occurs in a middle position of the coil 202, which helps to guarantee balance of the winding.

As shown in FIG. 5, in the plurality of first jumper wires 301 connecting the adjacent coils 202, spans of the plurality of first jumper wires 301 are equal.

In the example, the coil 202 includes three branches 205, so at the first end of the coil 202, there are three first jumper wires 301 connecting the adjacent coils 202. The first jumper wire 301 crosses from (9, 1) to (18, 1), the second first jumper wire 301 crosses from (10, 1) to (19, 1), the third first jumper wire 301 crosses from (11, 1) to (20, 1), and each of spans of the three first jumper wires 301 is 9.

In this way, the three first jumper wires 301 may completely have the same structure, so that structure varieties of the flat wire conductors are further reduced, the process difficulty is lowered, and the production efficiency is improved.

Likewise, in some examples, in the plurality of second jumper wires 302 connecting the adjacent coils 202, spans of the plurality of second jumper wires 302 are equal, so the plurality of second jumper wires 302 may completely have the same structure, thus the process difficulty is further reduced, and the production efficiency is improved.

In the example of the disclosure, in the plurality of second jumper wires 302 connecting the adjacent coils 202, a span of at least one second jumper wire 302 is larger than spans of the other second jumper wires 302.

By making the span of one second jumper wire 302 larger than the spans of the other second jumper wires 302, it is conducive to guaranteeing balance of the winding.

In some examples, if the same coil 202 includes Z branches 205, in the plurality of second jumper wires 302 connecting the adjacent coils 202, the span of the second jumper wire 302 with the largest span is k+Z, each of the spans of the other second jumper wires 302 is k, and k is a positive integer.

As shown in FIG. 5, at the second end of the coil 202, there are three second jumper wires 302 connecting the adjacent coils 202, the first second jumper wire 302 crosses from (10, 8) to (21, 8) and has a span of 11, the second jumper wire 302 crosses from (11, 8) to (19, 8) and has a span of 8, and the third second jumper wire 302 crosses from (12, 8) to (20, 8) and has a span of 8.

In other examples, as for the flat wire stator whose coil 202 includes four branches 205, a span of the second jumper wire 302 with the largest span may be 15, and each of spans of the other three second jumper wires 302 is 11.

Apart from the second jumper wire 302 with the largest span, the spans of the other second jumper wires 302 are equal, which helps to reduce the structure varieties of the second jumper wires 302, the process difficulty is further lowered, and the production efficiency is improved.

Each coil 202 is formed by connection of a plurality of hair-pin flat wires. As an example, the example of the disclosure provides structures of five types of hair-pin flat wires.

Figure 7:
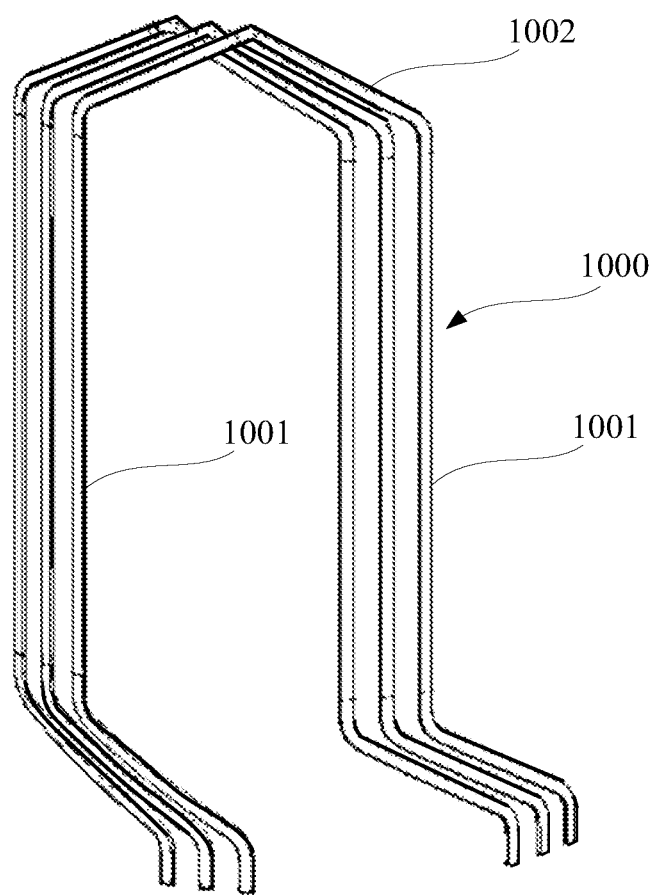
FIG. 7 is a schematic structural diagram of a first hair-pin flat wire provided by an example of the disclosure.

FIG. 7 is a schematic structural diagram of a first hair-pin flat wire provided by an example of the disclosure. Three first hair-pin flat wires 1000 are shown in the figure. As shown in FIG. 7, the first hair-pin flat wire 1000 includes two first straight-line sections 1001 and a first crossing-connection section 1002 which is connected with the two first straight-line sections 1001. When being installed on the iron core 10, the two first straight-line sections 1001 are located in the two iron core slots 10a and in a first layer in the iron core slots 10a. For example, six first straight-line sections 1001 of the three first hair-pin flat wires 1000 in FIG. 7 may correspond to (9, 1), (10, 1), (11, 1), (18, 1), (19, 1) and (20, 1) in FIG. 5, respectively. The first crossing-connection section 1002 is the first jumper wire 301. A span of the first crossing-connection section 1002 is 9.

Figure 8:
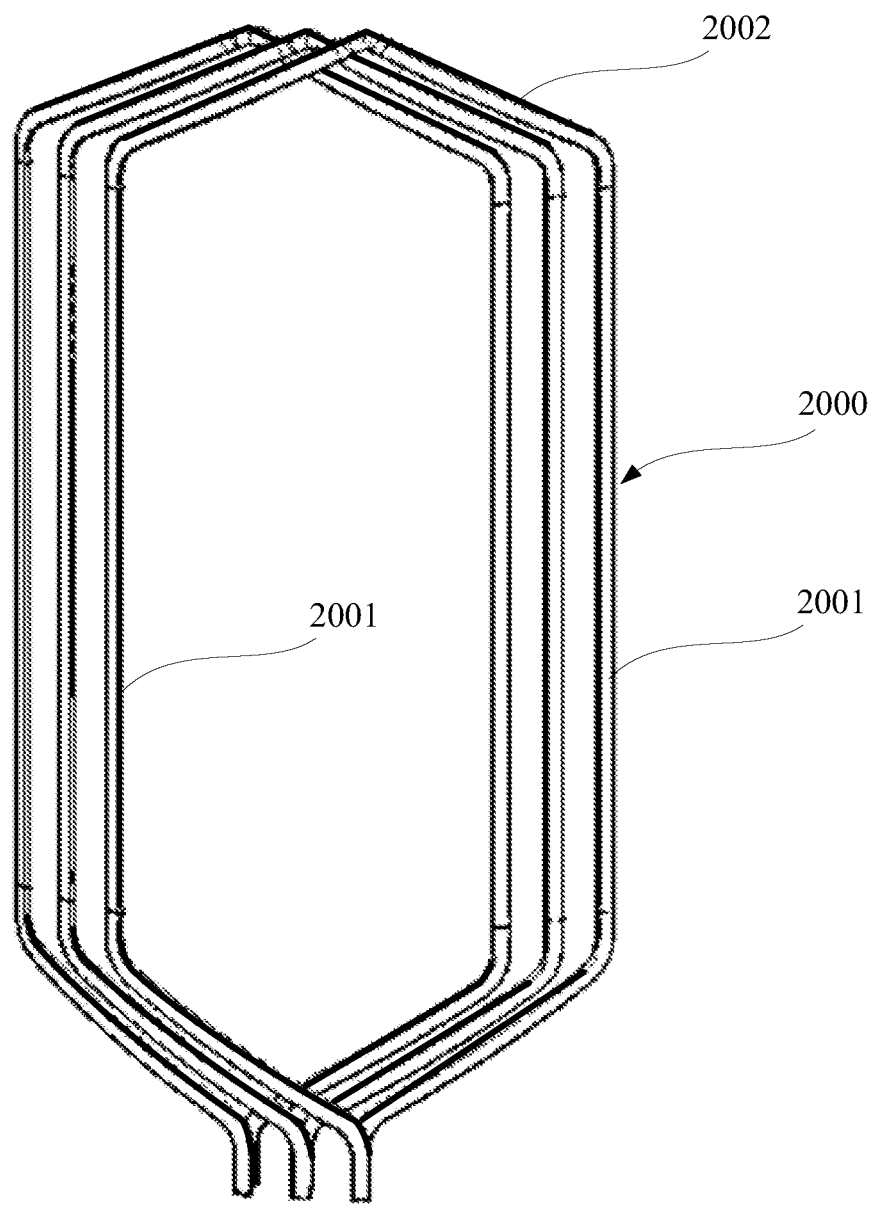
FIG. 8 is a schematic structural diagram of a second hair-pin flat wire provided by an example of the disclosure.

FIG. 8 is a schematic structural diagram of a second hair-pin flat wire provided by an example of the disclosure. Three second hair-pin flat wires 2000 are shown in the figure. As shown in FIG. 8, the second hair-pin flat wire 2000 includes two second straight-line sections 2001 and a second crossing-connection section 2002 which is connected with the two second straight-line sections 2001. When being installed on the iron core 10, the two second straight-line sections 2001 are located in the two iron core slots 10a and in a second layer and a third layer in the iron core slots 10a. For example, six second straight-line sections 2001 of the three second hair-pin flat wires 2000 in FIG. 8 may correspond to (9, 3), (10, 3), (11, 3), (18, 2), (19, 2) and (20, 2) in FIG. 5, respectively. A span of the second crossing-connection section 2002 is 9.

Figure 9:
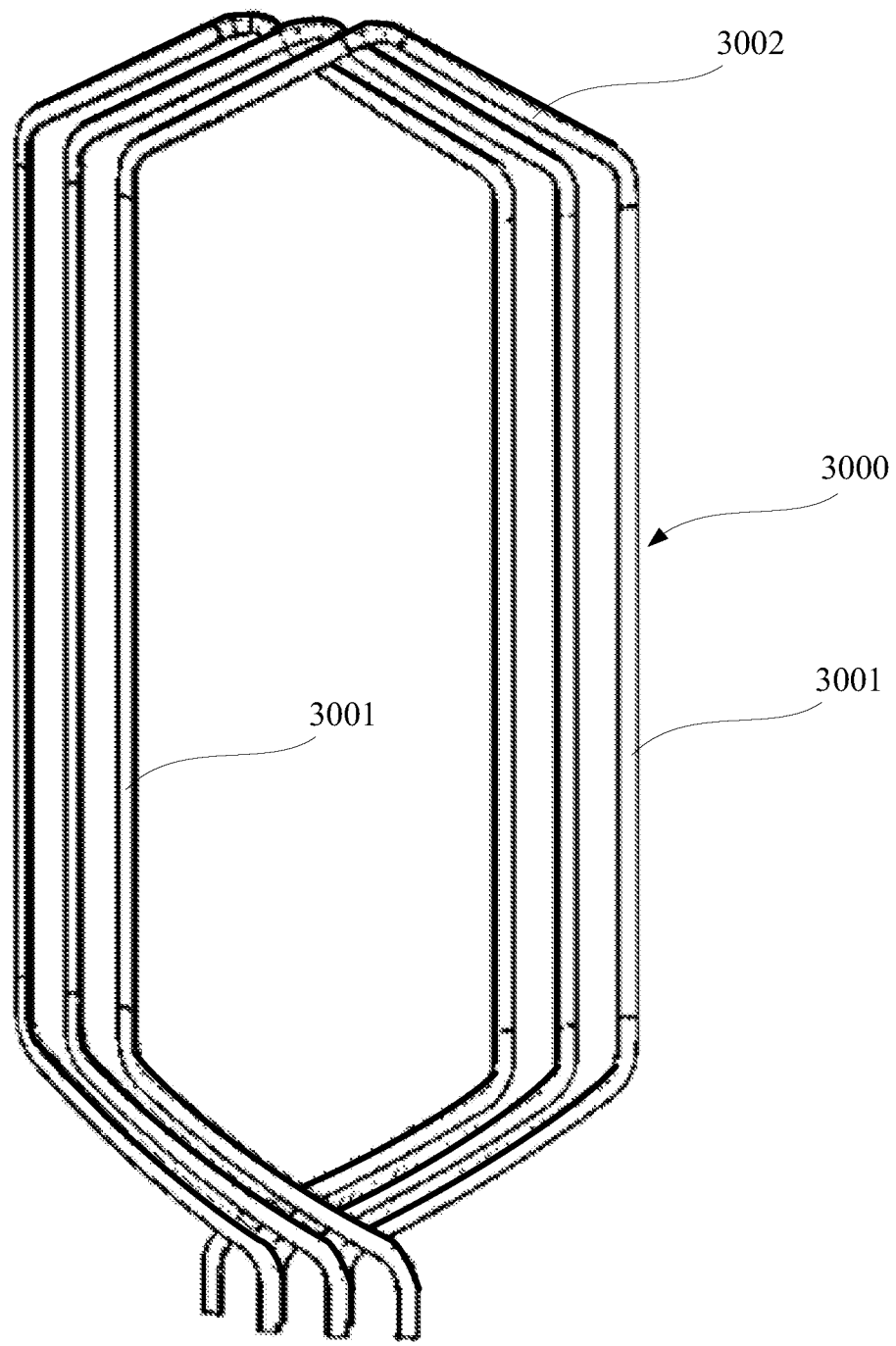
FIG. 9 is a schematic structural diagram of a third hair-pin flat wire provided by an example of the disclosure.

FIG. 9 is a schematic structural diagram of a third hair-pin flat wire provided by an example of the disclosure. Three third hair-pin flat wires 3000 are shown in the figure. As shown in FIG. 9, the third hair-pin flat wire 3000 includes two third straight-line sections 3001 and a third crossing-connection section 3002 which is connected with the two third straight-line sections 3001. When being installed on the iron core 10, the two third straight-line sections 3001 are located in the two iron core slots 10a and in a fourth layer and a fifth layer in the iron core slots 10a. For example, six third straight-line sections 3001 of the three third hair-pin flat wires 3000 in FIG. 9 may correspond to (10, 5), (11, 5), (12, 5), (18, 4), (19, 4) and (20, 4) in FIG. 5, respectively. A span of the third crossing-connection section 3002 is 8.

Figure 10:
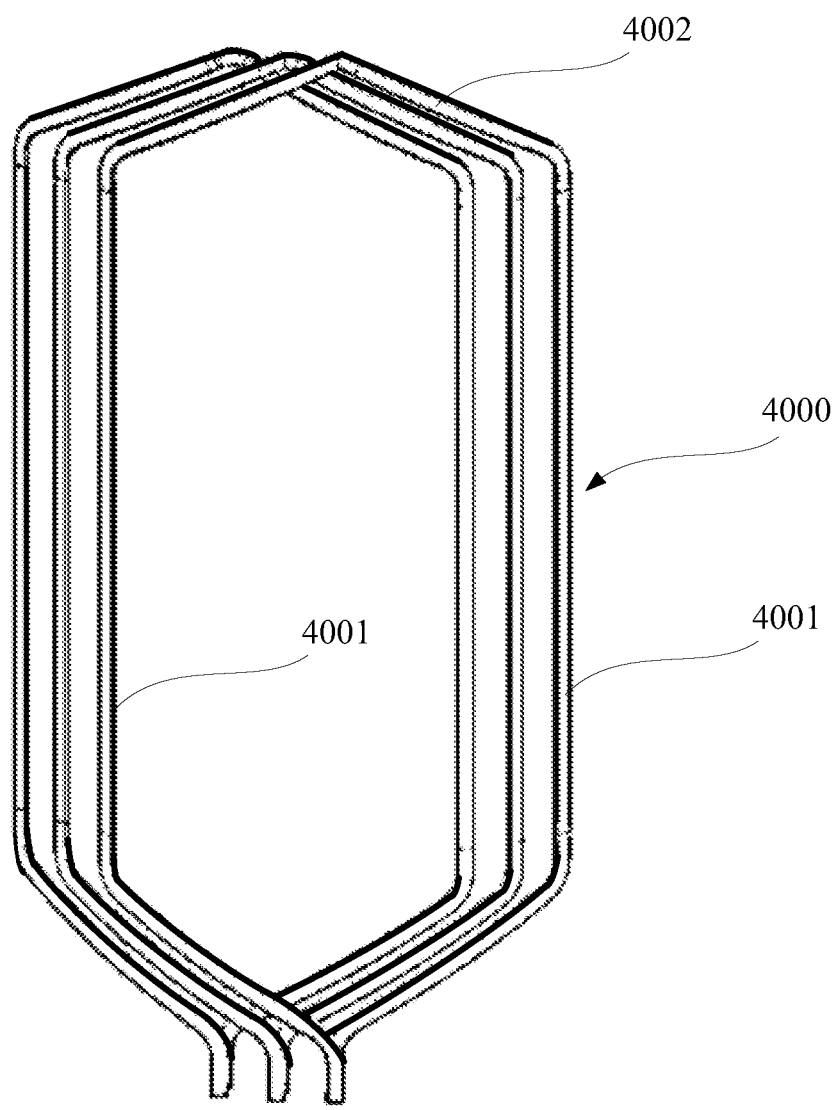
FIG. 10 is a schematic structural diagram of a fourth hair-pin flat wire provided by an example of the disclosure.

FIG. 10 is a schematic structural diagram of a fourth hair-pin flat wire provided by an example of the disclosure. Three fourth hair-pin flat wires 4000 are shown in the figure. As shown in FIG. 10, the fourth hair-pin flat wire 4000 includes two fourth straight-line sections 4001 and a fourth crossing-connection section 4002 which is connected with the two fourth straight-line sections 4001. When being installed on the iron core 10, the two fourth straight-line sections 4001 are located in the two iron core slots 10a and in a sixth layer and a seventh layer in the iron core slot 10a. For example, six fourth straight-line sections 4001 of the three fourth hair-pin flat wires 4000 in FIG. 10 may correspond to (10, 7), (11, 7), (12, 7), (19, 6), (20, 6) and (21, 6) in FIG. 5, respectively. A span of the fourth crossing-connection section 4002 is 9.

Figure 11:
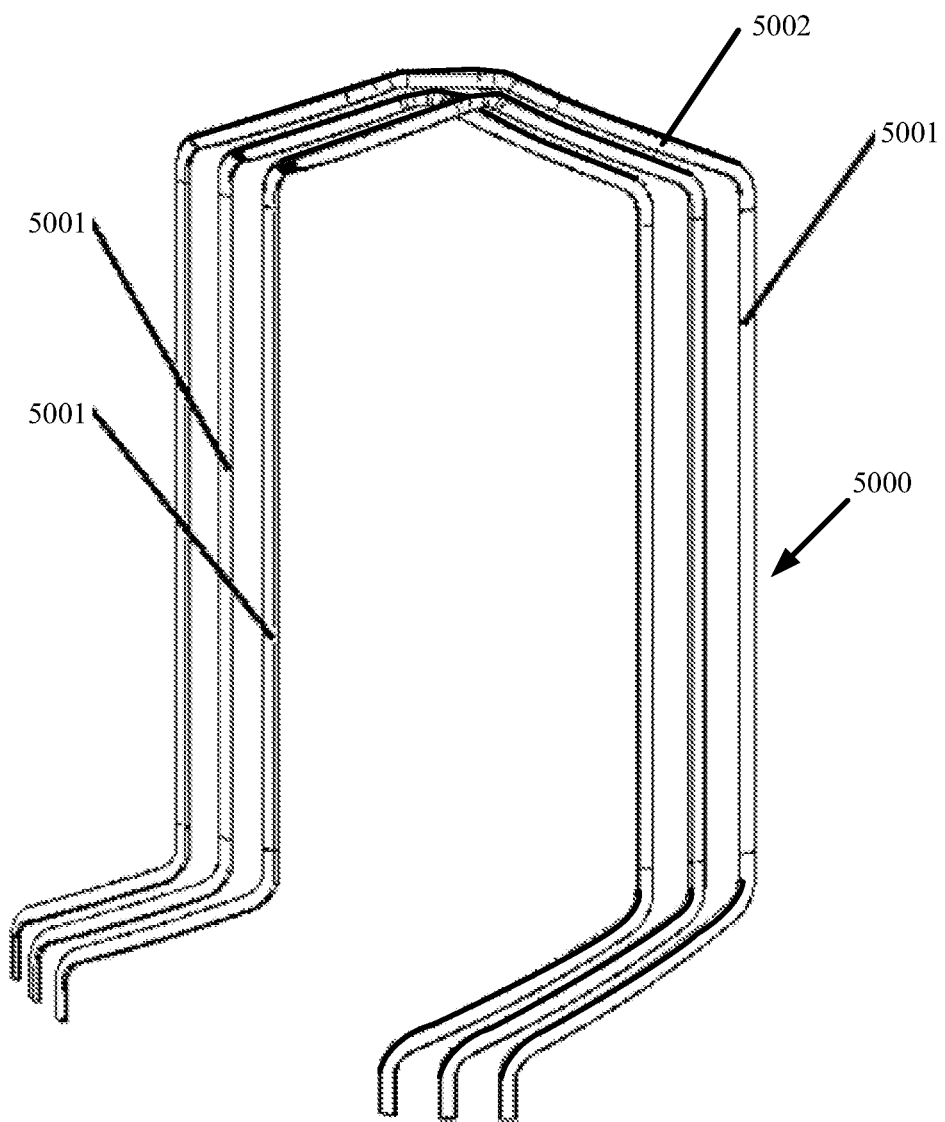
FIG. 11 is a schematic structural diagram of a fifth hair-pin flat wire provided by an example of the disclosure.

FIG. 11 is a schematic structural diagram of a fifth hair-pin flat wire provided by an example of the disclosure. Three fifth hair-pin flat wires 5000 are shown in the figure. As shown in FIG. 11, the fifth hair-pin flat wire 5000 includes two fifth straight-line sections 5001 and a fifth crossing-connection section 5002 which is connected with the two fifth straight-line sections 5001. When being installed on the iron core 10, the two fifth straight-line sections 5001 are located in the two iron core slots 10a and in an eighth layer in the iron core slots 10a. For example, six fifth straight-line sections 5001 of the three fifth hair-pin flat wires 5000 in FIG. 11 may correspond to (10, 8), (11, 8), (12, 8), (19, 8), (20, 8) and (21, 8) in FIG. 5, respectively. The fifth crossing-connection section 5002 is the second jumper wire 302. Spans of the fifth crossing-connection sections 5002 of the three fifth hair-pin flat wires 5000 are 11, 8 and 8 respectively.

After the first hair-pin flat wires 1000, the second hair-pin flat wires 2000, the third hair-pin flat wire 3000, the fourth hair-pin flat wires 4000 and the fifth hair-pin flat wires 5000 are installed on the iron core 10, a part of hair-pin flat wires may be welded, so that the first phase winding 201 is formed through connection.

An example of the disclosure further provides a motor. The motor includes a rotor and the flat wire stator shown in FIG. 1.

By arranging the winding in the same phase in a mode of including the plurality of coils connected in series in sequence, the plurality of coils are distributed in rotational symmetry around the axis of the iron core, the coils are wound in a part of the iron core slots, the first ends and the second ends of the coils are located on the sides of the iron core slots close to the axis of the iron core and on the sides of the iron core slots away from the axis of the iron core, respectively, that is, extending from the first ends of the coils to the second ends, a plurality of layers of windings are formed gradually instead of forming a layer of winding and then crossing to another layer to form another layer of winding, arranging an additional flat wire conductor for crossing from one layer to another layer is not needed, thus the varieties of the adopted hair-pin flat wires during wire winding can be reduced, and the production efficiency can be improved.

The above description is merely optional examples of the disclosure but is not intended to limit the disclosure. Any modification, equivalent replacement and improvement made within the spirit and principle of the disclosure are supposed to fall within the protection scope of the disclosure.

Additional non-limiting examples of the disclosure include:

1. A flat wire stator, including an iron core and a flat wire winding 20;

the iron core 10 has a plurality of iron core slots 10a;

the flat wire winding 20 includes a first phase winding 201, the first phase winding 201 includes a plurality of coils 202, the plurality of coils 202 are distributed in rotational symmetry around an axis of the iron core 10, the coils 202 are wound in a portion of iron core slots 10a in the plurality of iron core slots 10a, first ends and second ends of the coils 202 are located at the same end of the iron core 10, the first ends are located on sides of the iron core slots 10a close to the axis of the iron core 10, and the second ends are located on sides of the iron core slots 10a away from the axis of the iron core 10; and the plurality of coils 202 are connected in series in sequence, the first end of a coil 202 is connected to the first end of one coil 202 of two coils 202 adjacent to the coil, and the second end of the coil 202 is connected to the second end of the other coil 202 of the two coils 202 adjacent to the coil.

2. The flat wire stator according to example 1, the coils 202 include a plurality of branches 205, and the plurality of branches 205 in the same coil 202 are arranged by offset of one iron core slot 10a in sequence in a circumferential direction of the iron core 10;

at the first end of the coil 202, the plurality of branches 205 are connected in one-to-one correspondence with a plurality of branches 205 of one coil 202 of two coils 202 adjacent to the coil through a plurality of first jumper wires 301; and at the second end of the coil 202, the plurality of branches 205 are connected in one-to-one correspondence with a plurality of branches 205 of the other coil 202 of the two coils 202 adjacent to the coil through a plurality of second jumper wires 302.

3. The flat wire stator according to example 2, in the plurality of first jumper wires 301 connecting the adjacent coils 202, spans of the plurality of first jumper wires 301 are equal.

4. The flat wire stator according to example 2 or 3, in the plurality of second jumper wires 302 connecting the adjacent coils 202, spans of the plurality of second jumper wires 302 are equal.

5. The flat wire stator according to example 2 or 3, in the plurality of second jumper wires 302 connecting the adjacent coils 202, a span of at least one second jumper wire 302 is larger than spans of the other second jumper wires 302.

6. The flat wire stator according to example 5, the same coil 202 includes Z branches 205, Z is an integer no smaller than 3, in the plurality of second jumper wires 302 connecting the adjacent coils 202, the span of the second jumper wire 302 with the largest span is k+Z, each of the spans of the other second jumper wires 302 is k, and k is a positive integer.

7. The flat wire stator according to any one of examples 2-6, the branch 205 of the plurality of branches includes a first sub-coil 203 and a second sub-coil 204 connected to each other, and the first sub-coil 203 is located on one side of the second sub-coil 204 close to the axis of the iron core 10; and the first sub-coil 203 is wound in the two iron core slots 10a which are mutually spaced, the second sub-coil 204 is wound in the other two iron core slots 10a which are mutually spaced, the two iron core slots 10a where the second sub-coil 204 is located are offset by one iron core slot 10a in the same direction respectively relative to the two iron core slots 10a where the first sub-coil 203 is located.

8. The flat wire stator according to any one of examples 1-7, including 18p iron core slots 10a, p is the number of pole-pairs, and 4 m turns of the coils in each iron core slot 10a, m is a positive integer, that is the quantity of the iron core slots 10a is 18p, the quantity of turns of the coils in each iron core slot 10a is 4 m.

9. The flat wire stator according to any one of examples 1-8, the flat wire winding 20 further includes a second phase winding and a third phase winding, and the first phase winding 201, the second phase winding and the third phase winding are distributed in rotational symmetry around the axis of the iron core 10.

10. A motor, including a rotor and the flat wire stator according to any one of examples 1-9.

What is claimed is:

1. A flat wire stator, comprising an iron core and a flat wire winding, wherein the iron core has a plurality of iron core slots;

the flat wire winding comprises a first phase winding, the first phase winding comprises a plurality of coils, the plurality of coils are distributed in rotational symmetry around an axis of the iron core, the coils are wound in a portion of iron core slots in the plurality of iron core slots, first ends and second ends of the coils are located at the same end of the iron core, the first ends are located on sides of the iron core slots close to the axis of the iron core, and the second ends are located on sides of the iron core slots away from the axis of the iron core; and the plurality of coils are connected in series in sequence, the first end of a coil is connected to the first end of one coil of two coils adjacent to the coil, and the second end of the coil is connected to the second end of the other coil of the two coils adjacent to the coil, wherein the coils comprise a plurality of branches, and the plurality of branches in the same coil are arranged by offset of one iron core slot in sequence in a circumferential direction of the iron core, at the first end of the coil, the plurality of branches are connected in one-to-one correspondence with a plurality of branches of one coil of two coils adjacent to the coil through a plurality of first jumper wires, and at the second end of the coil, the plurality of branches are connected in one-to-one correspondence with a plurality of branches of the other coil of the two coils adjacent to the coil through a plurality of second jumper wires.

2. The flat wire stator according to claim 1, wherein in the plurality of first jumper wires connecting the adjacent coils, spans of the plurality of first jumper wires are equal.

3. The flat wire stator according to claim 2, wherein each branch of the plurality of branches comprises a first sub-coil and a second sub-coil connected to each other, and the first sub-coil is located on one side of the second sub-coil close to the axis of the iron core; and the first sub-coil is wound in the two iron core slots which are mutually spaced, the second sub-coil is wound in the other two iron core slots which are mutually spaced, the two iron core slots where the second sub-coil is located are offset by one iron core slot in the same direction respectively relative to the two iron core slots where the first sub-coil is located.

4. The flat wire stator according to claim 2, comprising 18p iron core slots wherein p is the number of pole-pairs, and 4 m turns of the coils in each iron core slot, wherein m is a positive integer.

5. The flat wire stator according to claim 1, wherein in the plurality of second jumper wires connecting the adjacent coils, spans of the plurality of second jumper wires are equal.

6. The flat wire stator according to claim 5, wherein each branch of the plurality of branches comprises a first sub-coil and a second sub-coil connected to each other, and the first sub-coil is located on one side of the second sub-coil close to the axis of the iron core; and the first sub-coil is wound in the two iron core slots which are mutually spaced, the second sub-coil is wound in the other two iron core slots which are mutually spaced, the two iron core slots where the second sub-coil is located are offset by one iron core slot in the same direction respectively relative to the two iron core slots where the first sub-coil is located.

7. The flat wire stator according to claim 5, comprising 18p iron core slots wherein p is the number of pole-pairs, and 4 m turns of the coils in each iron core slot, wherein m is a positive integer.

8. The flat wire stator according to claim 1, wherein in the plurality of second jumper wires connecting the adjacent coils, a span of at least one second jumper wire is larger than spans of the other second jumper wires.

9. The flat wire stator according to claim 8, wherein the same coil comprises Z branches, Z is an integer no smaller than 3, in the plurality of second jumper wires connecting the adjacent coils, the span of the second jumper wire with the largest span is k+Z, each of the spans of the other second jumper wires is k, and k is a positive integer.

10. The flat wire stator according to claim 9, wherein each branch of the plurality of branches comprises a first sub-coil and a second sub-coil connected to each other, and the first sub-coil is located on one side of the second sub-coil close to the axis of the iron core; and the first sub-coil is wound in the two iron core slots which are mutually spaced, the second sub-coil is wound in the other two iron core slots which are mutually spaced, the two iron core slots where the second sub-coil is located are offset by one iron core slot in the same direction respectively relative to the two iron core slots where the first sub-coil is located.

11. The flat wire stator according to claim 9, comprising 18p iron core slots wherein p is the number of pole-pairs, and 4 m turns of the coils in each iron core slot, wherein m is a positive integer.

12. The flat wire stator according to claim 8, wherein each branch of the plurality of branches comprises a first sub-coil and a second sub-coil connected to each other, and the first sub-coil is located on one side of the second sub-coil close to the axis of the iron core; and the first sub-coil is wound in the two iron core slots which are mutually spaced, the second sub-coil is wound in the other two iron core slots which are mutually spaced, the two iron core slots where the second sub-coil is located are offset by one iron core slot in the same direction respectively relative to the two iron core slots where the first sub-coil is located.

13. The flat wire stator according to claim 8, comprising 18p iron core slots wherein p is the number of pole-pairs, and 4 m turns of the coils in each iron core slot, wherein m is a positive integer.

14. The flat wire stator according to claim 1, wherein each branch of the plurality of branches comprises a first sub-coil and a second sub-coil connected to each other, and the first sub-coil is located on one side of the second sub-coil close to the axis of the iron core; and the first sub-coil is wound in the two iron core slots which are mutually spaced, the second sub-coil is wound in the other two iron core slots which are mutually spaced, the two iron core slots where the second sub-coil is located are offset by one iron core slot in the same direction respectively relative to the two iron core slots where the first sub-coil is located.

15. The flat wire stator according to claim 1, comprising 18p iron core slots wherein p is the number of pole-pairs, and 4 m turns of the coils in each iron core slot, wherein m is a positive integer.

16. The flat wire stator according to claim 1, wherein the flat wire winding further comprises a second phase winding and a third phase winding, and the first phase winding, the second phase winding and the third phase winding are distributed in rotational symmetry around the axis of the iron core.

17. A motor, comprising:
a rotor; and
a flat wire stator, wherein the flat wire stator comprises an iron core and a flat wire winding, wherein
the iron core has a plurality of iron core slots;
the flat wire winding comprises a first phase winding, the first phase winding comprises a plurality of coils, the plurality of coils are distributed in rotational symmetry around an axis of the iron core, the coils are wound in a portion of iron core slots in the plurality of iron core slots, first ends and second ends of the coils are located at the same end of the iron core, the first ends are located on sides of the iron core slots close to the axis of the iron core, and the second ends are located on sides of the iron core slots away from the axis of the iron core; and
the plurality of coils are connected in series in sequence, the first end of a coil is connected to the first end of one coil of two coils adjacent to the coil, and the second end of the coil is connected to the second end of the other coil of the two coils adjacent to the coil, wherein
the coils comprise a plurality of branches, and the plurality of branches in the same coil are arranged by offset of one iron core slot in sequence in a circumferential direction of the iron core,
at the first end of the coil, the plurality of branches are connected in one-to-one correspondence with a plurality of branches of one coil of two coils adjacent to the coil through a plurality of first jumper wires, and
at the second end of the coil, the plurality of branches are connected in one-to-one correspondence with a plurality of branches of the other coil of the two coils adjacent to the coil through a plurality of second jumper wires.

* * * * *

UNITED STATES PATENT AND TRADEMARK OFFICE
CERTIFICATE OF CORRECTION

| | |
|---|---|
| PATENT NO. | : 12,294,265 B2 |
| APPLICATION NO. | : 17/877058 |
| DATED | : May 6, 2025 |
| INVENTOR(S) | : Wenhui Luo |

It is certified that error appears in the above-identified patent and that said Letters Patent is hereby corrected as shown below:

On the Title Page
Item (57), under "Abstract", in Column 2, Line 1, delete "stator which includes" and insert -- stator includes --, therefor.

In the Specification
In Column 1, Line 65, delete "coil." and insert -- coil; --, therefor.
In Column 4, Line 30, delete "4 m," and insert -- 4m, --, therefor.
In Column 4, Line 37, delete "as insulate" and insert -- as to insulate --, therefor.
In Column 4, Line 55, delete ""I," "II" . . . "VII"" and insert -- "I", "II", . . . , "VIII" --, therefor.
In Column 10, Line 3, delete "4 m" and insert -- 4m --, therefor.
In Column 10, Line 6, delete "4 m." and insert -- 4m. --, therefor.

In the Claims
In Column 10, Line 66, in Claim 4, delete "4 m" and insert -- 4m --, therefor.
In Column 11, Line 20, in Claim 7, delete "4 m" and insert -- 4m --, therefor.
In Column 11, Line 47, in Claim 11, delete "4 m" and insert -- 4m --, therefor.
In Column 12, Line 3, in Claim 13, delete "4 m" and insert -- 4m --, therefor.
In Column 12, Line 18, in Claim 15, delete "4 m" and insert -- 4m --, therefor.

Signed and Sealed this
Eighth Day of July, 2025

Coke Morgan Stewart
*Acting Director of the United States Patent and Trademark Office*